United States Patent [19]

Zwern

[11] Patent Number: 5,193,141
[45] Date of Patent: Mar. 9, 1993

[54] VEHICULAR VOICE STORAGE, PLAYBACK, AND BROADCASTING DEVICE

[76] Inventor: Arthur L. Zwern, 170 S. Morrison Ave., San Jose, Calif. 95126

[21] Appl. No.: 615,212

[22] Filed: Nov. 19, 1990

[51] Int. Cl.⁵ .......................... G10L 9/00; G11C 15/00
[52] U.S. Cl. ........................................... 395/2; 381/86; 340/426
[58] Field of Search ..................... 340/460, 996, 425.5, 340/426; 381/36–40, 51, 81, 82, 86; 395/2

[56] References Cited

U.S. PATENT DOCUMENTS

| | | | |
|---|---|---|---|
| 4,035,589 | 7/1977 | Parke | 381/82 |
| 4,190,819 | 2/1980 | Burgyan | 340/996 |
| 4,314,232 | 2/1982 | Tsunoda | 340/460 |
| 4,352,089 | 9/1982 | Yano et al. | 340/460 |
| 4,359,713 | 11/1982 | Tsunoda | 340/460 |
| 4,368,988 | 1/1983 | Tahara et al. | 381/51 |
| 4,371,750 | 2/1983 | Markley | 381/81 |
| 4,389,541 | 6/1983 | Nakano et al. | 381/51 |
| 4,636,876 | 1/1987 | Schwartz | 381/51 |
| 4,698,776 | 10/1987 | Shibata | 395/2 |
| 4,794,368 | 12/1988 | Grossheim et al. | 340/426 |
| 4,856,072 | 8/1989 | Schneider et al. | 381/86 |
| 4,897,630 | 1/1990 | Nykerk | 340/426 |
| 4,987,402 | 1/1991 | Nykerk | 340/426 |

Primary Examiner—Michael R. Fleming
Assistant Examiner—David D. Knepper
Attorney, Agent, or Firm—Rosenblum, Parish & Isaacs

[57] ABSTRACT

A device for broadcasting a user's audio messages from a vehicle that includes an input device for inputting the user's audio messages, a signal processor for converting the user's messages to an electronically storable format and an erasable memory for storing the user's messages in a randomly addressable manner. The various stored messages may then be broadcast by the user in random order at the selection of the user. Additionally, the device may be activated by an alarm sensor to broadcast preselected user messages in the event that the alarm sensor is triggered.

16 Claims, 5 Drawing Sheets

VEHICULAR VOICE STORAGE, PLAYBACK, AND BROADCASTING DEVICE

BACKGROUND OF THE INVENTION

1. Field of the Invention

The present invention relates generally to storage and retrieval of voice messages in vehicular environments and is more particularly concerned with a system that allows repeated temporary storage and replay of voice messages either at the driver's discretion or in response to conditions of the vehicles, with such messages reproduced through an audio system that broadcasts a likeness of the user's own voice.

2. Description of the Prior Art

In the prior art, there have been developed various devices for permanently storing and replaying factory-programmed voice messages for purposes of warning drivers regarding features of the driver's own vehicle, such as open doors, seatbelts not fastened, or the vehicle's position with respect to external landmarks. Such systems are now factory installed in many vehicles, and the art is well known.

Nonetheless, none of the systems described in the prior art are capable of both storing and replaying customized messages at the command of the vehicle's driver, but instead replay factory-programmed messages based on triggering by preselected mechanical events such as vehicle features or time/date. An additional weakness of these systems is that since the voice messages must be factory-programmed, they do not allow arbitrarily selected new messages to replace old messages at the user's discretion, and the messages are not played back in the user's voice or even necessarily in the user's native language. A further weakness is that these systems use a tape recorder, disk, or drum to store analog voice recordings which is bulky and unreliable, or they use voice synthesis electronics which results in poor intelligibility and a machine-like vocal quality.

There have also been developed various devices capable of storing arbitrary user-spoken voice information using a tape recorder, and playing back that information to the occupants of the vehicle in which the recorder is installed. Some such systems have been integrated within systems that provide vehicle feature warnings, however, none of the systems referred to are capable of replaying messages at a volume suitable for broadcasting to listeners outside of the vehicle in which playback occurs, nor are any of the systems capable of replaying the user's own voice in response to features of the vehicle such as open door or alarm triggered. An additional weakness of the systems referred to is that due to the use of tape recorders as a storage medium, they are less reliable and are bulkier than systems utilizing electronic voice storage, and they can not conveniently replay stored messages instantaneously in any random order. Also, many of these systems are extremely complex to use and install, are incorporated as a portion of a more comprehensive vehicle warning system, or require factory installation by the vehicle's manufacturer.

U.S. Pat. No. 4,839,749 issued Jun. 13, 1989 to Franklin, discloses a vehicle safety and personal message system that is designed to provide playback of factory-programmed spoken messages to vehicle occupants in response to actuation by vehicle sensors, and to provide playback of user-recorded messages at dates and times selected via an alarm clock. The device incorporates a tape recorder that can be accessed by service technicians for customization of safety messages, and incorporates a removable external microphone that can be inserted by the user when accessing the tape recorder for customization of up to two date/time triggered messages.

U.S. Pat. No. 4,426,691 issued Jan. 17, 1984 to Kawasaki, discloses a voice warning device for vehicular occupants that is designed to reproduce a plurality of factory-recorded warning messages in response to preselected abnormal conditions of vehicle sensors, and to repeat the last message played at the will of the driver. The device incorporates a record disc as a recording medium.

U.S. Pat. No. 4,389,639 issued Jun. 21, 1983 to Torii et al, discloses a voice warning device that provides factory-programmed synthesized voice warnings over the same speakers that are connected to the vehicle radio or cassette player. Additionally, the device incorporates circuitry that controls the radio or cassette volume level and the warning volume level to allow the warning to be heard above the sound of the radio or cassette.

U.S. Pat. No. 4,352,089 issued Sep. 28, 1982 to Yano et al, discloses a factory-programmed synthesized voice warning system for automotive vehicles that adjusts its output volume according to the volume of the audio system provided in the vehicle. Additionally, the device enables the vehicle occupants to select and playback messages regarding features of the vehicle at will.

U.S. Pat. No. 4,190,819 issued Feb. 26, 1980 to Burgyan, discloses a motor vehicle information system having a tape recorder that can automatically deliver sequential prerecorded messages at predetermined intervals, in response to the vehicle's odometer.

Recently, several prior art devices relating to the current invention have been introduced commercially, though no patent information has been found. The first is a system that allows storage and playback of written messages to individuals outside the host vehicle, using light emitting diode arrays positioned in the vehicle rear window or on the vehicle's rear license plate frame. These systems suffer from several weaknesses, in that they require typing to program, are subject to readability problems in bright sunlight, and are only capable of communicating messages in a direction directly posterior to the host vehicle.

Another system comprising the most recent prior art relevant to the current invention consists of an automotive burglar alarm that announces spoken warnings external to the vehicle when an individual approaches within a pre-set perimeter boundary. While this device teaches the ability to record and playback spoken messages directed outside the host vehicle, it is not used while the host vehicle is in motion. It is also not capable of allowing the user to store personalized, non-factory programmed messages, nor does it allow the driver to actuate playback of a particular message on command.

SUMMARY OF THE INVENTION

It is therefore an object of the current invention to provide a vehicular voice storage, retrieval, and playback system that allows erasure and re-recording of stored messages at the user's command, and allows playback of such messages through an audio system that broadcasts a likeness of the user's voice.

It is another object of the current invention to provide a vehicular voice storage, retrieval, and playback system that allows playback of stored messages at the user's command or in response to conditions of the vehicle, and allows playback of such messages through and audio system that broadcasts a likeness of the user's voice.

It is a further object of the current invention to provide a vehicular voice storage, retrieval, and playback system that incorporates a combination of improved reliability, smaller size, higher convenience, user-installability, and improved reproduction quality, by using electronic memory for voice storage.

It is yet another object of the current invention to provide a novel and improved means for communication from vehicles via storing spoken messages, retrieving such messages, and broadcasting such messages external to the host vehicle, through an audio system that broadcasts a likeness of the user's voice.

It is yet a further object of the current invention to provide a novel and improved means for communicating from vehicles in all directions, for purposes of entertainment, requesting assistance, or announcing conditions of the vehicle.

It is still another object of the current invention to provide a circuit that can be easily adapted for use in a variety of devices employing concise, user-recorded message retrieval, including telephone ringers, door bells, robotics, vending machines, and many other consumer related products.

In accordance with the present invention, there has been devised a convenient, low cost method and apparatus for storing, replaying, and broadcasting spoken messages to the environment surrounding host vehicles which is broadly comprised of a means for input/storage/control intended to be mounted inside the passenger compartment of the host vehicle and a means for amplification/output intended to be mounted in the engine compartment or other suitable location on the host vehicle. Said means for input/storage/control incorporates audio transducer means to accept voice input, voice processing means to perform various audio filtering, preamplification, and memory management functions and convert transducer input into a digital, adaptive delta modulation (ADM) format, and semiconductor means to store messages. Also included in said input/storage/control means are various means for use-control that provide for selection of recording, playback, or real-time voice amplification and broadcasting, selection from between several discrete stored messages, activation and deactivation of recording, playback, and real-time broadcasting, and means for broadcasting at two different volumes. Whenever said control means is triggered to broadcast messages, real-time input is filtered, preamplified, and output from the input/storage/control unit, or memory output is reconverted to analog signals filtered, preamplified, and output from said unit. This output is fed to said means for amplification/output, which incorporates electronic means for audio filtering and power amplification, as well as audio transducer means for broadcast output.

As applied to a convenient messages storage and broadcasting device for warning other drivers, requesting assistance from other drivers, or otherwise communicating with individuals outside the host vehicle, the input/storage/control device provides means for storing and replaying up to three distinct messages, and playback can be in any order as selected by the driver using a three-position toggle switch. A second three position toggle switch selects between record, play, and real-time broadcasting functions. A single momentary pushbutton is wired to the voice processing circuit and the function selection toggle switch in a manner that allows the button to be held down to trigger recording and released to halt recording, plus allows a momentary push to activate broadcasting of an entire message during playback mode. A reset button is incorporated behind a normally closed panel to provide for clearing all messages from memory prior to re-recording.

An additional important feature resides in the means to enter a standby mode of operation whenever the ignition system of the vehicle is deactivated, said means consisting of a transistor-based circuit to detect the presence of ignition voltage, and a microprocessor-based function that minimizes current drain on the vehicle electrical system in the absence of ignition voltage by maintaining voltage to power the memory while shutting down all non-memory circuit elements.

An additional important features in the ability to trigger output and broadcasting of individual messages via automatic means instead of manual control. This feature allows the invention to be used in place of the siren in vehicular alarm systems, for purposes of providing customized alerts defined by the vehicle owner. Such alerts constitute a significant improvement over simple sirens or factory-programmed alerts, since they provide the ability to identify the vehicle that has been disturbed.

An additional important feature resides in the ability to replace the amplification/output means located in the engine compartment with a less powerful amplification/output means residing in the passenger compartment, for purposes of providing user-customized warnings and alerts to occupants of the host vehicle.

An additional important feature resides in the ability to add a control circuit that disconnects or mutes the vehicle audio system during recording and/or playback of messages.

It is an advantage of the current invention that it provides for a vehicular voice storage, retrieval, and playback system that allows erasure and re-recording of stored messages at the user's command, and allows playback of such messages through an audio system that broadcasts a likeness of the user's voice.

It is another advantage of the current invention that it provides a vehicular voice storage, retrieval, and playback system that allows playback of stored messages at the user's command or in response to conditions of the vehicle, and allows playback of such messages through an audio system that broadcasts a likeness of the user's voice.

It is a further advantage of the current invention that it provides a vehicular voice storage, retrieval, and playback system that incorporates a combination of improved reliability, smaller size, higher convenience, user-installability, and improved reproduction quality, by using electronic memory for voice storage.

It is yet another advantage of the current invention that it provides a novel and improved means for communication from vehicles via storing spoken messages, retrieving such messages, and broadcasting such messages external to the host vehicle, through an audio system that broadcasts a likeness of the user's voice.

It is yet a further advantage of the current invention that it provides a novel and improved means for communicating from vehicles in all directions, for purposes of entertainment, requesting assistance, or announcing conditions of the vehicle.

It is still another advantage of the current invention that it provides a circuit that can be easily adapted for use in a variety of devices employing concise, user-recorded message retrieval, including automotive cruise control devices, telephone ringers, door bells, robotics, vending machines, and many other consumer related products.

The above and other objects, features, and advantages of the present invention will become more readily understood and appreciated from a consideration of the following detailed description of a preferred embodiment when taken together with the accompanying drawings, which, however, should not be taken as limitative to the present invention but for elucidation and explanation only.

DETAILED DESCRIPTION OF PREFERRED EMBODIMENT

The system of this invention 10 comprises an input/control/storage device 12 located inside the passenger compartment of the vehicle, and an amplification/output device 14 located in the engine compartment or other suitably protected vehicle location with open-air access to the outside environment.

Figure 1:
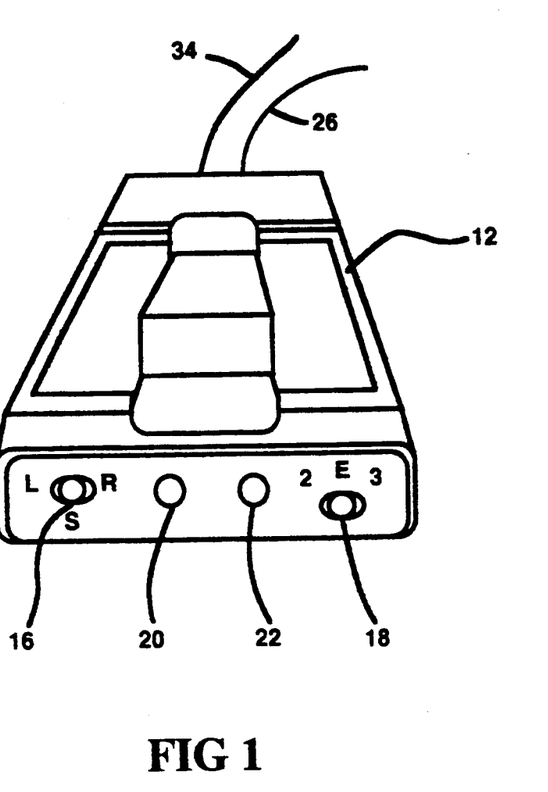
FIG. 1 is a perspective view of an input/control/storage device, which is used in the vehicular voice storage, playback, and broadcasting device of the present invention.

Referring to FIG. 1, the preferred embodiment of input/storage/control device 12 incorporates a front panel containing two toggle switches 16 and 18, one pushbutton switch 20, and one high-sensitivity microphone 22. Live/play/record switch 16 is a double pole, double throw toggle switch used to select between storing new phrases, playing back previously stored phrases, or broadcasting spoken words in real-time. Phrase selector switch 18 is a single pole, double throw toggle switch used to select up to three different phrases to store and play back, and which triggers a higher volume during playback of one of the phrases as will be described. Start button 20 is a double pole, double throw momentary pushbutton switch used to activate playback and recording.

An alternative embodiment of input/storage/control device 12 provides for automatic activation of playback and broadcasting triggered by an automotive alarm system, and incorporates analogous but distinct means for control. In such an embodiment, the input/storage/control device electronics 12 are preferably co-located in the engine compartment with the amplification/output device 14. An alternative embodiment of amplification/output device 14 provides for automatic activation of playback within the passenger compartment only, triggered either manually or as a result of vehicle sensors. In such an embodiment, the amplification/output device 14 electronics are preferably located in the passenger compartment with input/storage/control device 12. Hence, when the description given herebelow refers to voice recording, playback, and live broadcasting from vehicles, it should be appreciated that there are many alternate embodiments for implementing control of these functions, and therefore the current invention is not to be limited to the specified items.

Figure 2:
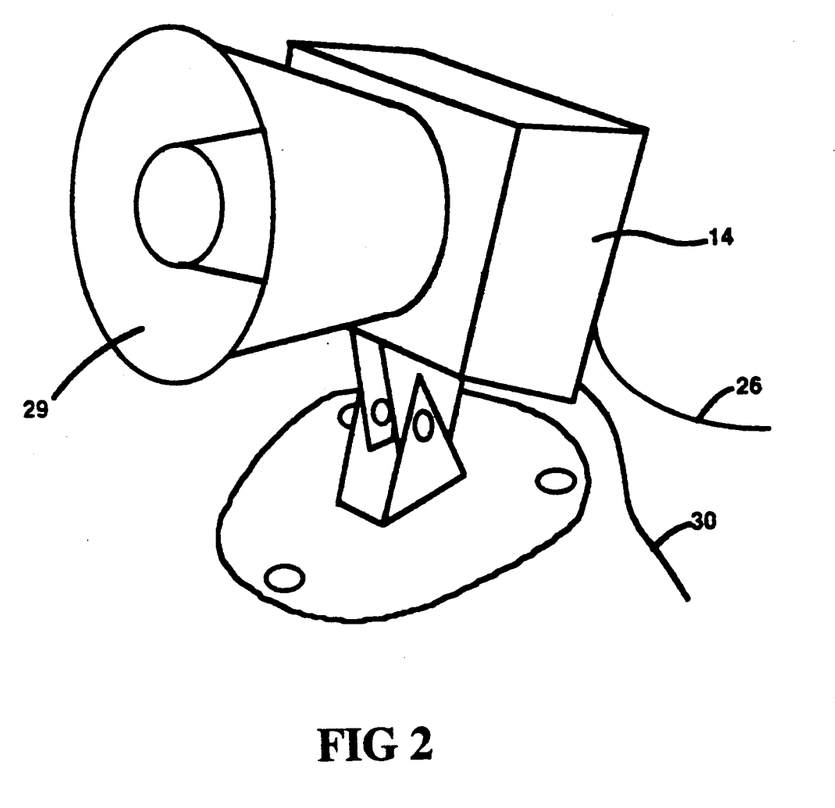
FIG. 2 is a perspective view of an amplification/loudspeaker device, which is used in the present invention.
Figure 3:
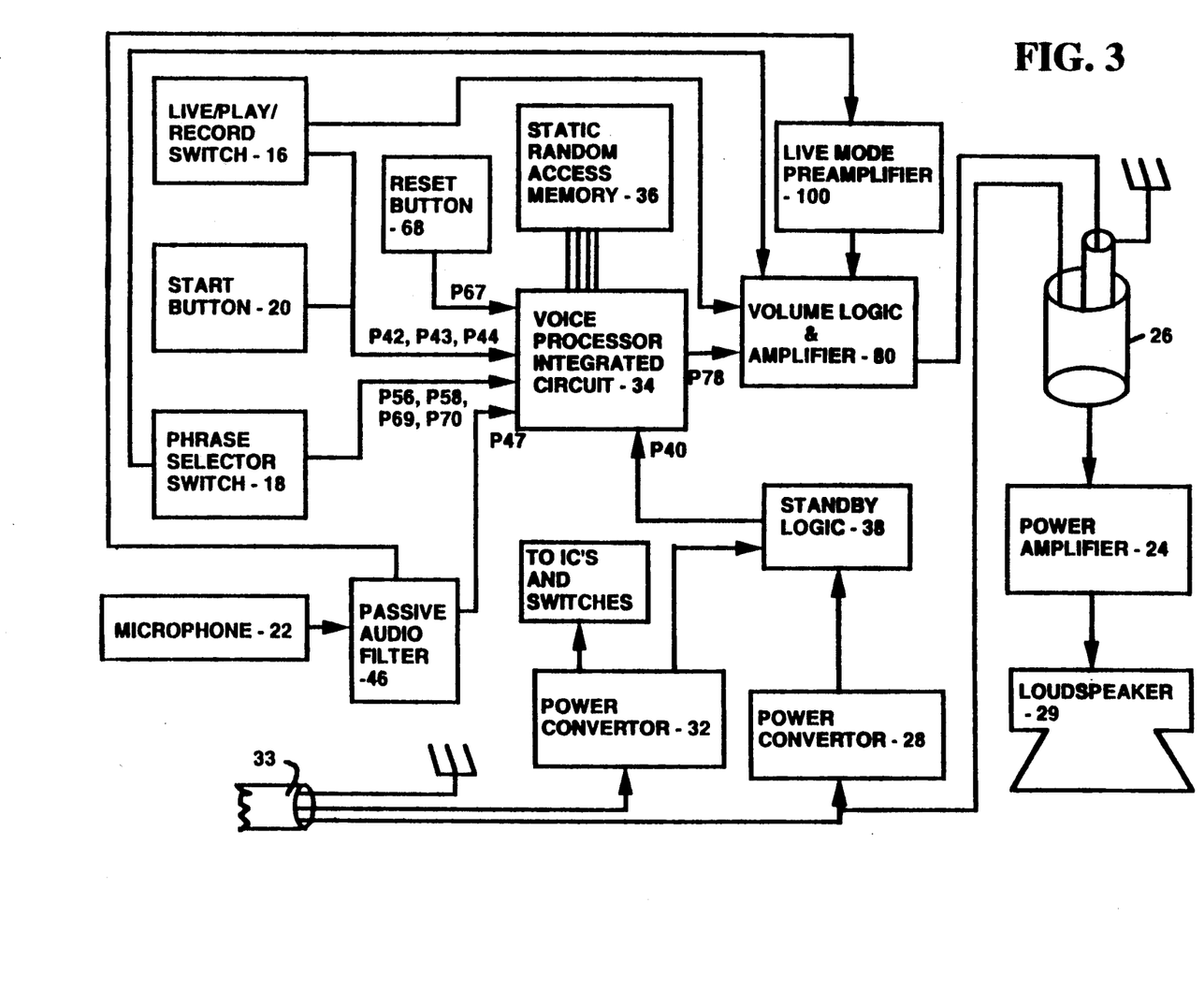
FIG. 3 is a block diagram showing a general construction of a preferred embodiment of a voice storage, playback, and broadcasting device according to the present invention.

Referring to FIGS. 2 and 3, amplification/loudspeaker device 14 incorporates an audio power amplifier circuit 24 housed inside a watertight enclosure integral to the amplification/loudspeaker device 14. Power amplifier circuit 24 is connected to the output of input/storage/control device 12 by means of a cable 26 incorporating a signal wire, a shield for the signal, and a 12 volt power wire, with power supplied from the input to switched power convertor 28. Amplification/loudspeaker device 14 also includes a loudspeaker driver 29, and a ground wire 30, which is attached to a suitable location on the vehicle chassis to achieve a completed power circuit to the power amplifier 24.

Referring to FIG. 3, fused 12 volt power from the vehicle's permanently connected power system is supplied to the constant power convertor 32 at all times through input power cable 33, and is converted to 5 volt power by constant power convertor 32. This constant fused power provided by the constant power convertor 32 is supplied to the voice processor integrated circuit 34, the static random access memory 36, and other locations such as integrated circuits and switches within the input/storage/control device 12.

Fused 12 volt power from the vehicle's ignition system is supplied to the switched power convertor 28 through input power cable 33, and is converted to 5 volt power only when the ignition switch is in the on or start positions. When the standby logic 38 detects that switched power matches constant power, it outputs a 5 volt signal to pin P40 of the voice processor integrated circuit 34 to enable all operating functions. Whenever the standby logic 38 detects that switched power is significantly below constant power, no signal is provided to pin P40 of the voice processor integrated circuit 34, causing the voice processor integrated circuit 34 to enter the standby mode. When the voice processor integrated circuit 34 is in the standby mode, current is provided to the static random access memory 36 to allow retention of stored phrases, but all other functions of the voice processor integrated circuit 34 are shun down to minimize drain on the vehicle's battery.

Figure 4:
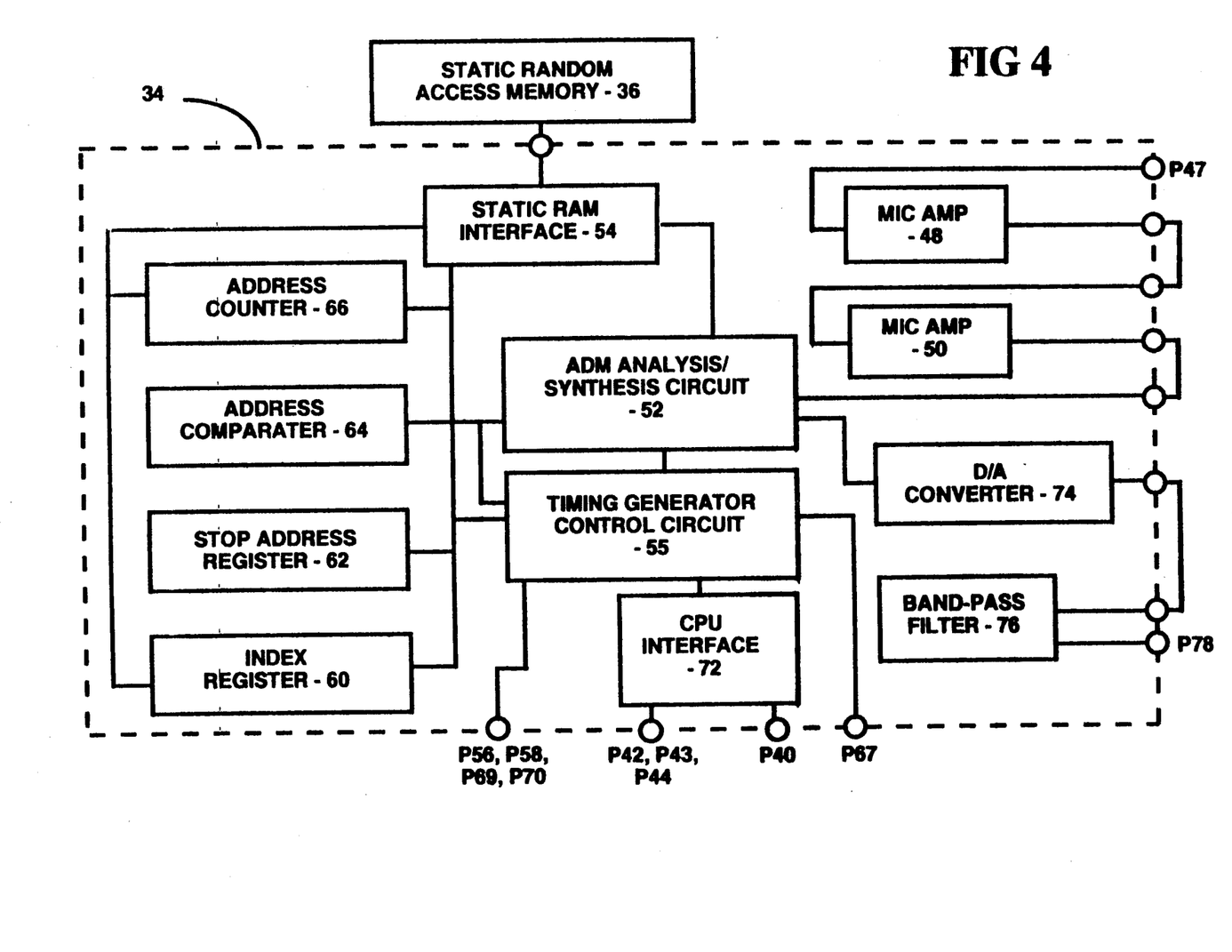
FIG. 4 is a block diagram showing the key circuit elements within a commercially available voice processing integrated circuit, which is used ion the present invention.
Figure 5:
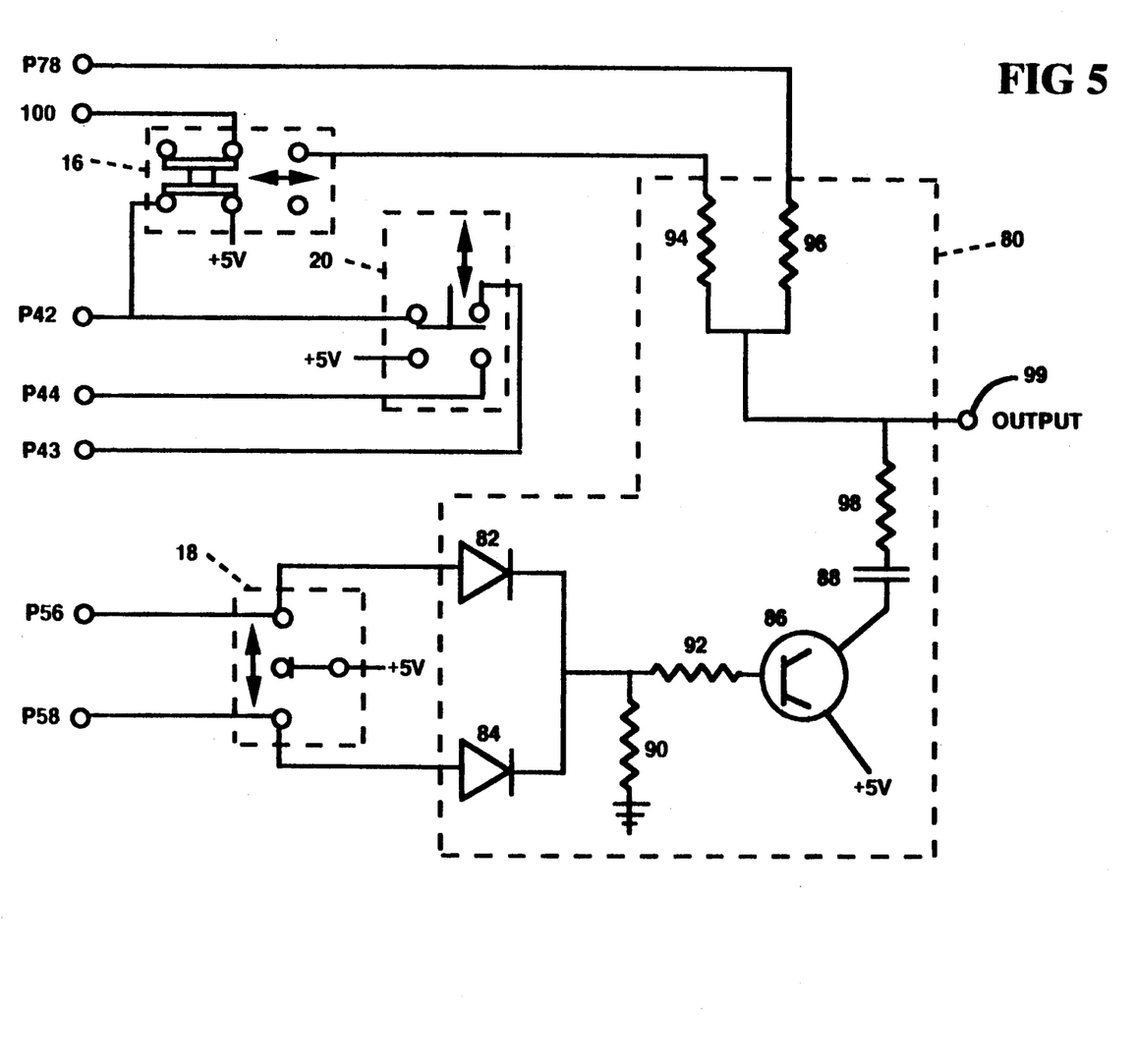
FIG. 5 is a circuit diagram showing the detailed circuit construction of the switches, controls, and other elements of the input/control/storage device.

When power is supplied to constant power convertor 32 and the switched power convertor 28, the invention's function depends on the position of the live/play/record switch 16. Referring also to FIGS. 4 and 5 showing details of FIG. 3 and of voice processor integrated circuit 34, when the live play/record switch 16 is in the record position, phrases can be stored by holding down start button 20, which is connected to one pole of live/play/record switch 16 and pins P42, P43 and P44 of voice processor integrated circuit 34 is a manner such that audio signals entering the microphone 22 are passed through the passive audio filter 46 to remove unwanted low frequency components, and are received by the voice processor integrated circuit 34 at pin P47. Following preamplification at locations 48 and 50 of the voice processor integrated circuit 34, the signal is received at location 52, where an adaptive delta modulation (ADM) circuit samples the audio signal and converts each sample to a single bit representation of the signal's amplitude change since the prior sample. The digital output of location 52 is sent through location 54 to the static random access memory 36, where each bit of data is sequentially stored for later retrieval. All timing and control functions are managed by timing generator control circuit 55.

The address locations at which storage occurs within the static random access memory 36 are determined by the position of phrase selector switch 18, which is connected to pins P56 and P58 of the voice processor integrated circuit 34. The phrase selector switch 18 has three positions, allowing three phrase storage locations to be defined as start and stop addresses within the static random access memory 36 by addressing components 60, 62, 64, and 66 of the voice processor integrated circuit 34. The start address for the first phrase is always zero, and each phrase's stop address is determined by position 62 when the start button 20 is released. The start address for each succeeding message is automatically determined as the stop address of the prior message plus a binary one by position 62. To erase and re-record new messages, the voice processor integrated circuit incorporates a reset function, which is activated by momentarily providing power to pin P67 using reset button 68. An alternative embodiment allowing up to sixteen message locations is possible, using a phrase selector switch 18 with up to sixteen positions, wired to pins P56, P58, P69, and P70 of voice processor integrated circuit 34, however, such alternative embodiment requires a large capacity static random access memory 36 to allow practical phrase lengths.

Once phrases are recorded as described above, they may be played back by changing the position of the live/play/record switch 16 to "play", which disconnects power from pin P42 and P43 of the voice processor integrated circuit 34, causing the CPU 72 to enter the play mode. When in the play mode, the invention plays back a single phrase each time start button 20 is pressed to provide power to pin P54, where the particular phrase that is played depends on the position of phrase selector switch 18 as during recording. During playback, phrases can be played back in random order, as both the start and stop addresses of each phrase were memorized by position 62 during recording.

During playback, signal processing occurs as follows, referring to FIGS. 1 to 5, particularly FIGS. 3, 4, and 5: When start button 20 is pressed, the CPU 72 controls output of the stored phrase in ADM format from static random access memory 36, with the signal sequentially passed through the ADM circuit 52 to convert from ADM format to digital, through the D/A convertor circuit 74 to convert from digital to analog, and through the band-pass filter 76 to eliminate acoustic artifacts created during the conversion to ADM format. The signal is then output at pin P78, and sent to volume logic and amplifier 80.

Volume logic and amplifier 80 uses two diodes 82 and 84, one transistor 86, one capacitor 88, and five resistors 90, 92, 94, 96, and 98 to detect the position of phrase selector switch 18 and boost the signal by a factor of ten when phrase selector switch 18 is in the center position. This provides the ability to record one of the three phrases for playback specifically in emergency situations, where broadcasting at approximately the amplitude of a conventional automotive horn is desirable. The output 99 of volume logic and amplifier 80 is sent through cable 26 to the amplifier 24, which can be implemented in many ways commonly known to those skilled in the art.

The preferred embodiment of the invention includes the capability of bypassing the recording and playbacks circuitry and allowing amplification and output of spoken phrases in real-time. This is accomplished by setting the live/play/record switch 16 to "live", such that audio signals entering the microphone 22 are passed through the passive audio filter 46 to remove unwanted low frequency components, and are passed to live mode preamplifier 100 before bypassing voice processor integrated circuit 34 and proceeding directly to volume logic and amplifier 80.

Live mode preamplifier 100 is used because preamplifiers at positions 48 and 50 of the voice processor integrated circuit 34 are only activated by voice processor integrated circuit 34 during recording, so during live broadcasting an alternative means of providing an amplification factor of 200 is required. To account for this difference, the live mode preamplifier 100 boosts the output of passive audio filter 46 by 200 times using a common dual-stage operational amplifier approach. The live signal is then processed by volume logic and amplifier 80, power amplifier 24, and loudspeaker 29 exactly as is done during playback.

The live mode preamplifier 100 is always active, but its output is only used when live/play/record switch 16 is set to the "live" position, which connects the output of live mode preamplifier 100 to the input of volume logic and amplifier 80.

While the invention has been shown and described with reference to particular preferred embodiments, it will be understood by those skilled in the art that various alterations and modifications in form and detail may be made therein. Accordingly, it is intended that the following claims cover all such alterations and modifications that may fall within the true spirit and scope of the invention.

What is claimed is:

1. A device for storing and replaying speech in vehicles, comprising:
    input means being disposed in said vehicle for receiving a plurality of audio messages from a user;
    conversion means for converting said audio messages into electronic signals representative thereof;
    memory storage means for the retained storage of said electronic signals, said memory storage means being capable of storing said electronic signals in a randomly accessible format;
    memory address means acting in coordination with said memory storage means to provide a known address within said memory storage means at which said electronic signals are stored, each of said plurality of messages having a unique address within said memory storage means;
    replay means being activatable by said user to cause the outputting from said memory storage means of user selected portions of said electronic signals which portions represent one of said audio messages; and
    message broadcast means being disposed in said vehicle and being activated by said replay means and functioning to broadcast said audio messages externally from said vehicle.

2. A device as described in claim 1 wherein a message volume control means is provided to enable said user to control the volume at which said voice message is broadcast.

3. A device as described in claim 1 further including an alarm sensing means, said alarm sensing means being activated by predetermined conditions proximate said vehicle and acting to cause said replay means to select a preidentified message from said memory storage means for broadcast by said message broadcast means.

4. A device as described in claim 3 wherein said input means is disposed away from a passenger compartment of said vehicle and said message broadcast means is disposed away from said passenger compartment of said vehicle.

5. A device as described in claim 3 further including an instantaneous transmission means, said instantaneous transmission means being selectable by a user and functioning to contemporaneously transmit said electronic signals from said input means to said message broadcast means.

6. A device as described in claim 1 wherein said input means is disposed in a passenger compartment of said vehicle.

7. A device as described in claim 1 wherein said message broadcast means is disposed away from said passenger compartment of said vehicle.

8. A device as described in claim 1 further including an instantaneous transmission means, said instantaneous transmission means being selectable by a user and functioning to contemporaneously transmit said electronic signals from said input means to said message broadcast means.

9. A device as described in claim 1 further including an instantaneous transmission means, said instantaneous transmission means being selectable by a user and functioning to contemporaneously transmit said electronic signals from said input means to said message broadcast means.

10. A device for storing and replaying speech in vehicles comprising:
    input means for receiving a plurality of audio messages from a user of said device;
    conversion means for converting said audio messages into electronic signals representative thereof;
    signal processor means including a user erasable memory storage means, said signal processor means functioning to receive said electronic signals, convert said electronic signals into converted signals having an electronically storable format and transmit said converted signals to said erasable memory storage means, said erasable memory storage means functioning to store a plurality of said audio messages in the form of said converted signals;
    said signal processor means further including a memory address means adapted to identify and store an address value representative of the location of each said audio message store in said erasable memory storage means;
    user control means being provided to adapt said advice for the recording of said user's audio messages or the replay of said user's audio messages from said erasable memory storage means;
    said user control means also being adapted to allow the selection of a particular audio message from said erasable memory storage means for replay through an audio message replay means;
    audio message replay means functioning to transmit a selected particular one of said user's audio messages from said erasable memory storage means to said signal processor means, said user's audio message being converted by said signal processor means from a converted signal to and analog signal representative of said selected user's audio message;
    amplifier means being engaged to said signal processor means to receive said analog signal and to amplify said analog signal and transmit said amplified analog signal to a message broadcast means; and
    message broadcast means functioning to receive said amplified selected signal and convert it into an audible signal, whereby said selected user's audio message will be audibly broadcast by said message broadcast means of said device externally from said vehicle.

11. A device as described in claim 10 further including an alarm sensing means, said alarm sensing means being activated by predetermined conditions proximate said vehicle and acting to cause said audio message replay means to transmit a preselected one or more of said user's voice messages stored in said erasable memory storage means.

12. A device as described in claim 11 wherein said input means is disposed in a passenger compartment of said vehicle.

13. A device as described in claim 11 wherein said message broadcast means is disposed away from said passenger compartment of said vehicle.

14. A device as described in claim 11 wherein said input means is disposed away from a passenger compartment of said vehicle and said message broadcast means is disposed away from said passenger compartment of said vehicle.

15. A device as described in claim 10 further including as instantaneous transmission means, said transmission means being selectable by a user and functioning to contemporaneously transmit said electronic signals from said input means to said amplifier means.

16. A device for storing and replaying speech in vehicles, comprising:
    input means being disposed in said vehicle for receiving a plurality of audio messages from a user;
    conversion means for converting said audio messages into electronic signals representative thereof;
    memory storage means for the retained storage of said electronic signals, said memory storage means being capable of storing said electronic signals in a randomly accessible format;
    memory address means acting in coordination with said memory storage means to provide a known address within said memory storage means at which said electronic signals are stored, each of said plurality of messages having a unique address within said memory storage means;
    replay means being activatable to cause the outputting from said memory storage means of portions of said electronic signals which portions represent one of said audio messages;
    message broadcast means being disposed in said vehicle and being activated by said replay means and functioning to broadcast said audio messages externally from said vehicle; and
    alarm sensing means, said alarm sensing means acting to cause said replay means to output a pre-identified message from said memory storage means for broadcast by said message broadcast means.

* * * * *